United States Patent [19]

Bordignon

[11] Patent Number: 4,881,146
[45] Date of Patent: Nov. 14, 1989

[54] MASK FOR MAGNETIC TAPE CASSETTES
[75] Inventor: Abramo Bordignon, Senago, Italy
[73] Assignee: A.T.B. S.P.A., Senago Mi, Italy
[21] Appl. No.: 124,194
[22] Filed: Nov. 23, 1987
[30] Foreign Application Priority Data
  Dec. 4, 1986 [IT] Italy ................ 22582 A/86
[51] Int. Cl.$^4$ ............................ G11B 23/02
[52] U.S. Cl. ............................ 360/132; 242/199
[58] Field of Search ............ 360/132; 242/199
[56] References Cited

U.S. PATENT DOCUMENTS

| | | | |
|---|---|---|---|
| 3,977,626 | 8/1976 | Gaiser | 242/199 |
| 4,102,515 | 7/1978 | Milants | 242/199 |
| 4,191,984 | 3/1980 | Tsukidate | 360/132 |
| 4,632,334 | 12/1986 | Schaeffer | 360/132 X |

FOREIGN PATENT DOCUMENTS

| | | |
|---|---|---|
| 0203302 | 12/1986 | European Pat. Off. . |
| 273676 | 3/1979 | Fed. Rep. of Germany . |
| 51-29010 | 11/1976 | Japan . |
| 936832 | 9/1978 | U.S.S.R. . |
| 1236547 | 6/1986 | U.S.S.R. . |
| 2032388 | 5/1980 | United Kingdom . |

Primary Examiner—A. J. Heinz
Attorney, Agent, or Firm—Guido Modiano; Albert Josif

[57] ABSTRACT

The present invention relates to a mask for magnetic tape cassettes comprising a sheet-like element insertable between the axial ends of the reels of magnetic tape and the inner walls of the box-like shell of the cassette and defining a pair of through holes located at the hubs of said reels. The peculiarity of the invention resides in the fact that the sheet-like element defines at least one centering ridge with high elastic rigidity which engages at least partially with the peripheral region of the axial ends of said hubs, for centering of the hubs with respect to the middle plane of the cassette, and at least one alignment ridge with very low elastic rigidity engageable with the longitudinal edges of the magnetic tape, for aligning the windings of the reel of magnetic tape.

9 Claims, 3 Drawing Sheets

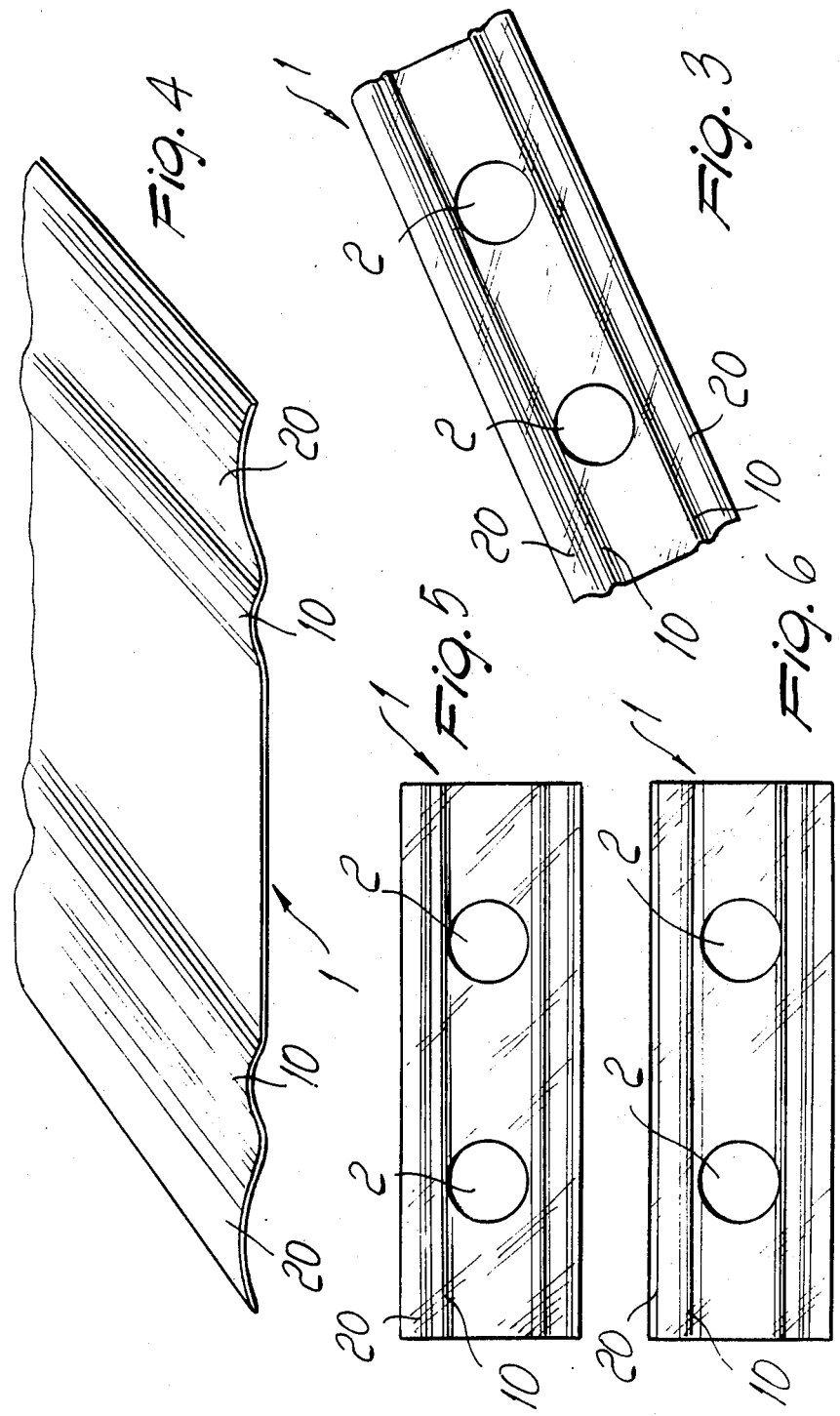

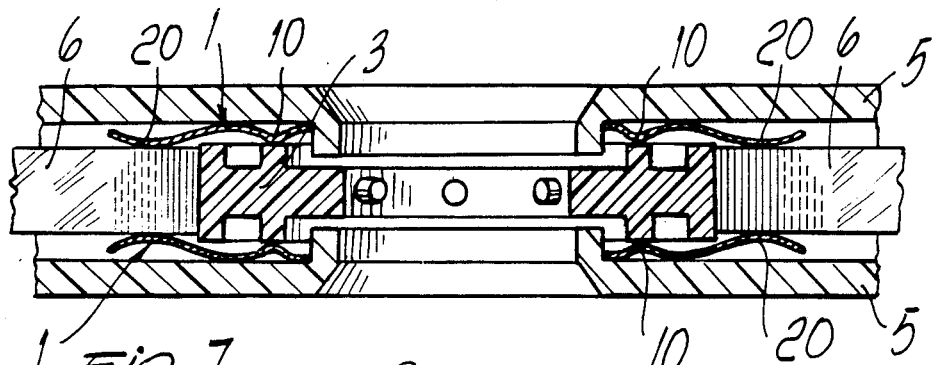
Fig. 7
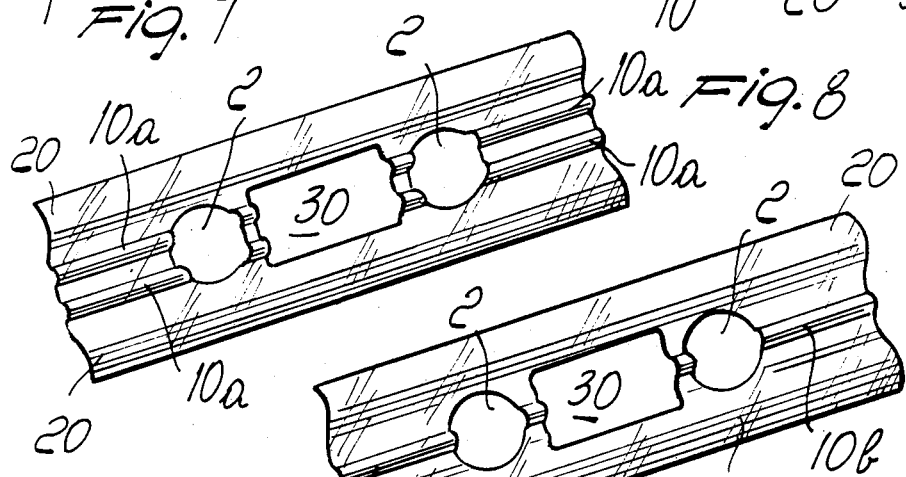
Fig. 8
Fig. 9
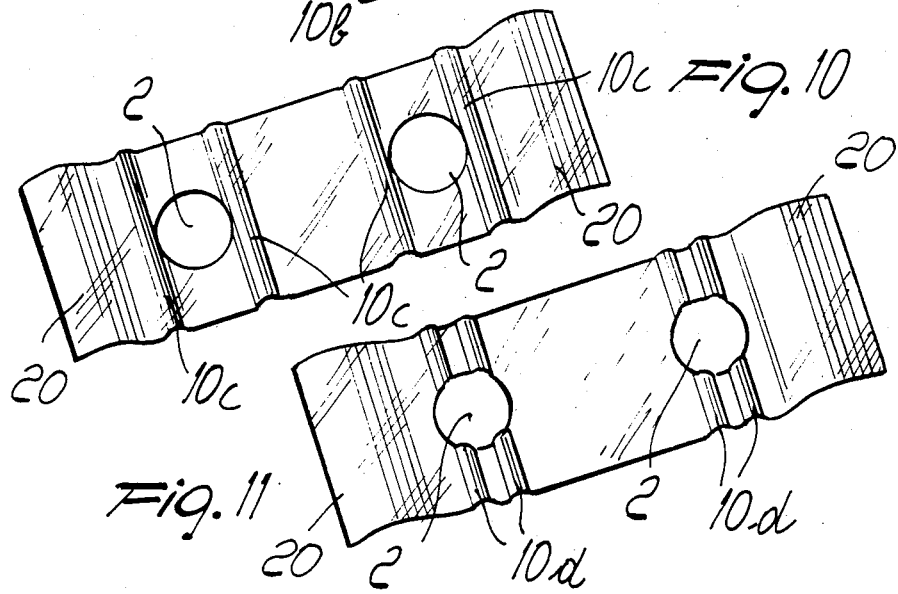
Fig. 10
Fig. 11

MASK FOR MAGNETIC TAPE CASSETTES

BACKGROUND OF THE INVENTION

The present invention relates to a mask for magnetic tape cassettes.

As is known, due to the continuous technical evolution, it is becoming increasingly important to obtain perfect alignment of the windings of magnetic tape of the reel housed in the box-like container which constitutes the cassette.

It is furthermore necessary to have a precise centering of the reel with respect to the middle plane of the cassette, in the direction of tape motion, orthogonal to the axis of rotation of said reels, in order to reduce the azimuth error, that is to say the angular error between the motion of the tape and the gap of the playback head.

To the above one must furthermore add that with the onset of superfast automatic machines for loading magnetic tape, with speeds above 30 m/s, the problem is increasingly felt of having a low torque caused by friction, both during the rapid-winding operations and later in the phase of practical use of the cassette in ordinary players or recorders.

The low friction coefficient reflects positively on the average life of the magnetic tape and the recording head, since the magnetic memory, constituted by the layer of magnetic oxide, has a thickness of a few microns (4/5 $\mu$m) which is considerably abrasive, since it is made of metallic oxides.

The ordinary cassette for magnetic tape is constituted by a box-like container, inside which are accommodated, in a freely retained region, two hubs whereon the magnetic tape is fixed.

In order to obtain the above described effects, the solutions currently adopted entail the use of masks, generally constituted by thin sheets of plastic material, such as polyester, which support the reel for its entire extension, specifically in the region affected by the magnetic tape, with constant elastic forces on every undulated profile of the particular shaping of said sheets.

Said masks are currently produced according to two quite distinct methods. A first method entails the provision of raised portions which extend radially with respect to the accommodation holes of the hubs, so as to obtain a distributed support of the reel of magnetic tape.

However, such known types of masks have the severe disadvantage of not being manufacturable in continuous production, since the individual masks must be shaped one by one, by means of molding operations or the like.

Another method which offers the possibility of continuous production has undulated shapes or ridges which generally extend longitudinally with respect to the longitudinal extension of the mask and have the function of supporting the magnetic tape at a plurality of points, so as to obtain both the alignment of the turns and the centering.

Since, as previously mentioned, the magnetic layers of the tape are obtained using highly abrasive metal oxides, low-friction regions must be provided at the regions of contact and are currently produced by applying layers of graphite or of other antifriction material at the tops of the undulations.

This solution, however, has the disadvantage that the provided undulations must support entirely the weight of the reel which, with the tape wound thereon, which can be estimated at approximately 12 g, and which moves alternately from one hub to the other during the motion of the tape inside the cassette.

In order to try and limit this disadvantage, a solution is already known wherein a two-step hub is provided which limits the axial displacement of the hub with respect to the inner walls of the box-like shell of the cassette, so as to obtain improved effects with regard to the centering of the reel of tape in the cassette.

According to the universally acknowledged international standards, the magnetic tape has a width or height of 3.81 mm, and a maximum play of the tape with respect to the inner wall of the box-like shell of 1.30 mm is allowed, while the axial length of the hub must be greater than 3.81 mm, i.e. the height of the tape, and is normally comprised between 3.90 and 4.10 mm.

SUMMARY OF THE INVENTION

The aim proposed by the present invention is indeed to provide a new type of mask which allows the perfect centering of the reel of magnetic tape in the box-like shell, together with a precise alignment of the reel windings.

Within the scope of the above described aim, a particular object of the invention is to provide a mask for cassettes of magnetic tape which allows low friction between the mask itself and the tape, thus offering the possibility of not applying the usual layers of antifriction material such as graphite and the like, though achieving a precise alignment of the tape windings on the reel.

Still another object of the present invention is to provide a mask which can be produced continuously, i.e. which has shaped portions which always extend parallel to one another, with the consequent possibility of very high hourly production.

Not least object of the present invention is to provide a mask for cassettes of magnetic tape which, besides having improved functional characteristics, has an extremely modest cost.

The above described aim, as well as the objects mentioned and others which will become apparent hereinafter, are achieved by a mask for magnetic tape cassettes, according to the invention, comprising a sheet-like element insertable between the axial ends of the reels of magnetic tape and the inner walls of the box-like shell of the cassette and defining a pair of through holes located at the hubs of said reels, characterized in that said sheet-like element defines at least one centering ridge with high elastic rigidity engageable at least partially with the peripheral region of the axial end of said hubs, for the centering of said hubs with respect to the middle plane of the cassette, and at least one alignment ridge with very low elastic rigidity engageable with the longitudinal edges of the magnetic tape, for aligning windings of the reel of magnetic tape.

BRIEF DESCRIPTION OF THE DRAWINGS

Further characteristics and advantages will become apparent from the description of a preferred, but not exclusive, embodiment of a mask for cassettes of magnetic tape, illustrated only by way of non-limitative example in the accompanying drawings, wherein:

FIG. 3 is a perspective view of the mask according to the invention;

FIG. 4 is a view of the profile of the mask according to the invention;

FIG. 5 is a view of the mask according to the invention from the face in contact with the reel of magnetic tape;

FIG. 6 is a view of the mask from the other side;

FIG. 7 is a transverse cross section view of the cassette, pointing out the location of the related masks;

FIG. 8 is a perspective view of a different embodiment of the mask;

FIG. 9 is a view of a further embodiment of the mask with a single ridge with high elastic rigidity;

FIGS. 10 and 11 are views of masks with their ridges extending transversely with respect to the extension of the mask.

DESCRIPTION OF THE PREFERRED EMBODIMENTS

Figure 1:
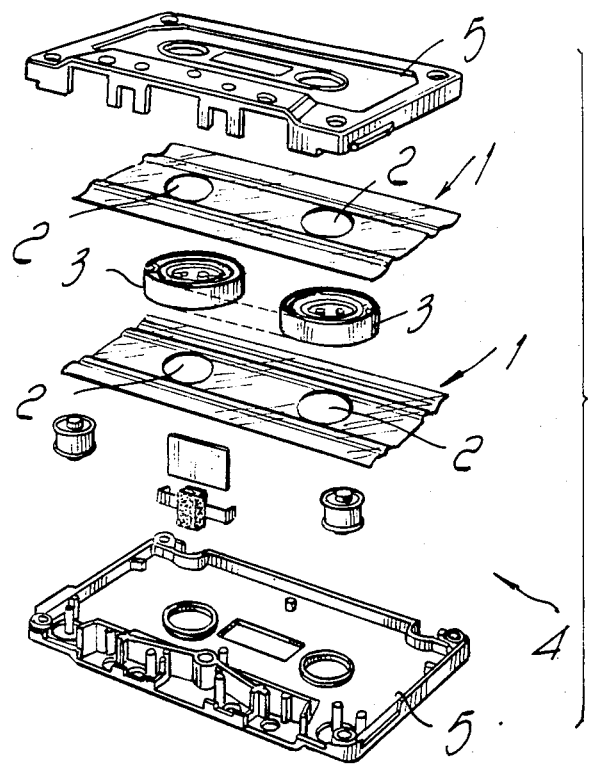
FIG. 1 is an exploded perspective view of a possible embodiment of a cassette of magnetic tape, pointing out the masks according to the invention.
Figure 2:
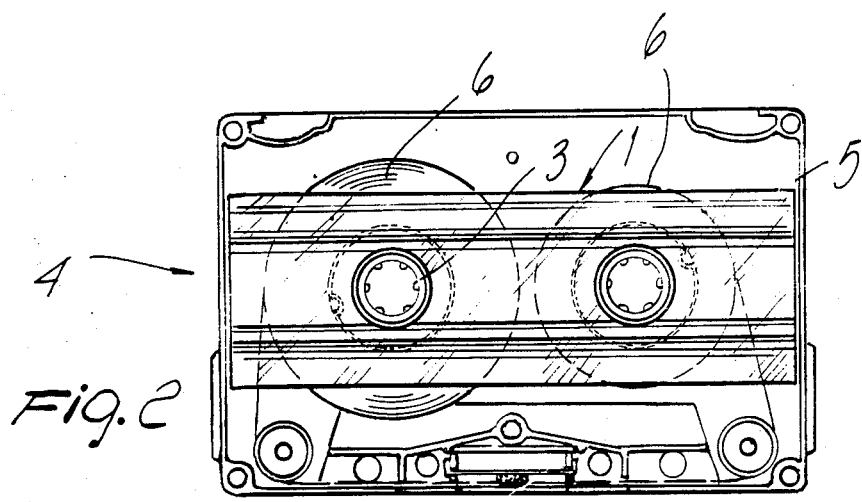
FIG. 2 is a plan view of a cassette, pointing out the arrangement of the mask with respect to the hub.

With reference to the above described figures, and in particular to FIGS. 1 to 7, the mask for cassettes of magnetic tape, according to the invention, comprises a sheet-like element 1 having a substantially elongated rectangular configuration which defines, in a per se known manner, a pair of through holes 2 located at the hubs 3 of a cassette, which is generally indicated by the reference numeral 4.

The sheet-like elements are inserted between the inner walls of the box-like shell 5 and the reel 6 of magnetic tape.

An important peculiarity of the invention resides in the fact that said sheet-like element has a pair of centering raised portions 10 having high rigidity, which extend longitudinally on the sheet-like element and are arranged substantially tangentially with respect to said through holes 2.

The centering ridges 10, which in transverse cross section can have an undulated, dome-like or cusp-like or double-pitched configuration, have a height with respect to the plane of arrangement of the sheet-like element which is substantially proportional and preferably equal to half the play existing between the axial end of the hub and the inner wall of the box-like shell which constitutes the cassette.

Said centering ridges 10 engage with the axial ends of the hubs 3, acting as supporting element.

The centering ridges have the peculiar function, since they are substantially semirigid, of supporting the hubs together with the total mass of the reel which moves from one hub to the other so as to arrange them symmetrically with respect to the middle plane of the cassette.

Since the hub has a greater axial height than the width or height of the magnetic tape, the magnetic tape is not affected by the substantially rigid centering ridges.

Since the hub has a diameter of approximately 21 mm, the maximum torque moment caused by friction is derived from the formula $$M = \frac{K \cdot p \cdot \phi}{2}$$

wherein p is the total weight of the full reel, K is the friction coefficient of the material of the mask on acetalic or other plastic material used for the manufacture of the hub, and $\phi$ is the diameter of the hub.

It should be specified that in conventional applications of masks having undulations and the like, said undulations predominantly affect and support the reel in the region of the magnetic tape, the maximum diameter whereof is approximately 54 mm.

By applying the abovementioned formula, one also obtains, beside the increase in the diameter, the increase of the friction coefficient which is notoriously greater between polyester and metallic oxides, so that due both to the increase in diameter and to the increase in the friction coefficient, the resulting torque, with the solutions of the prior art, is at least 2.5 times greater than that which is achieved with the mask according to the invention.

By virtue of this fact it is possible, with the mask according to the invention, to avoid applying antifriction products on the mask in the region of contact with the tape.

By virtue of the presence of the above described high-rigidity centering ridges 10, which act directly on the hubs, the possibility is thus allowed of always centering the reel on the middle axis of the cassette, regardless of the working position of the cassette itself, the elastic rigidity and the consequent axial displacement depending on the configuration of the raised portions and generally, by way of example, can vary, the rigidity from 0.8 to 0.16 mm per 100 grams and the consequent axial displacement from 0.1 to 0.02 mm.

In order to obtain the uniform alignment of the reel windings, the mask, according to the invention, provides the use of a pair of alignment ridges, indicated by 20, which are parallel to the centering ridges and are arranged externally thereto.

The alignment ridges have a height, with respect to the plane of arrangement of the sheet-like element, which is proportional and preferably greater or at the most equal to half the play existing between the height of the tape and the distance between the inner walls of the box-like shell or internal spacing.

Said alignment ridges have a very low elastic rigidity, that is to say they are provided with a width or curvature having an average radius of curvature which is considerably greater than the average radius of curvature of the centering ridges.

Said alignment ridges only have the function of aligning with a weak force, which can be ten times smaller than that of the centering ridges, the thin magnetic tape, which has a minimum thickness of 12 microns, in a perfectly parallel manner without telescoping effects and with an extremely low additional friction.

According to a preferred but non-limitative configuration, the alignment ridges, which have their convex part facing the reel of magnetic tape, have, in transverse cross section, a configuration with a development which can constantly increase towards the free edge or can be possibly folded towards the plane of arrangement of the mask by a selectively variable portion. This allows to reduce the width of the mask, contributing thereby to a considerable saving in material.

The combined adoption of the centering ridges and of the alignment ridges and the variable modulation of the configuration, of the width and of the consequent rigidity of the combined ridges allows to significantly reduce the thickness of the mask, contributing thereby to a further reduction in the employed material, this advantage being added to the fact that one is no longer forced to apply antifriction products to be spread on said mask.

A further important peculiarity of the invention resides in the fact that the ridges extend parallel to one another and consequently allow the possibility of being obtained with a continuous production at very high speed. The same effect is also obtainable with other embodiments, illustrated in FIGS. 8 to 11.

FIG. 8 illustrates a mask in which centering ridges 10a are provided which are arranged in pairs and secant with respect to the holes 2, the above described effects being obtained also in this case, with the difference that the support of the hub is not performed in two mutually diametral points, as in the preceding case, but in a plurality of mutually counterposed points.

A similar solution can also be obtained by using a single centering ridge, indicated by 10b in FIG. 9, which is provided on the longitudinal middle axis of the cassette.

The provision of the holes by punching on a region having ridges causes, though a circular punch is used, due to the elastic return of the sheet-like element, the obtainment of holes which in terms of functional purposes are ovalized, with the advantage of obtaining a self-locking of the mask on the edges which surround the holes of the cassette.

If the centering ridges are located in the region provided between the two holes 2, in order to prevent the occurrence of optical distortion phenomena in viewing the tape is it possible to provide windows, indicated by 30, by punching, said windows not interfering with the operation of the mask, as described above.

Both the centering and the alignment ridges can also extend transversely, that is to say perpendicular to the extension of the mask, as indicated in FIGS. 10 and 11.

In particular, FIG. 11 illustrates centering ridges indicated by 10c which are tangent to the holes 2, the alignment curves being arranged externally, with the possibility of having an even greater radius of curvature and consequently a further increased softness in the contact between the mask and the edge of the magnetic tape.

The solution illustrated in FIG. 11, in which the centering ridges, indicated by 10d, are arranged in side-by-side pairs which intersect the holes 2 of the mask and support the hub in a plurality of mutually counterposed points, is conceptually analogous.

From a production point of view, it is more advantageous for said ridges to extend either parallel or perpendicular with respect to the longitudinal extension of the mask, so as to allow high-speed manufacture with a continuous production of the shapings on the tape, contributing thereby to a considerable reduction in costs.

To the above one must furthermore add that it is possible to apply or not windows or other punchings on the masks, since the useful part of the operation of the provided ridges is concentrated at the region of the hubs, with regard to the centering ridges, and in the region of engagement with the edge of the tape with regard to the alignment ridges.

From the above it is thus apparent that the invention achieves the intended aim and objects, and in particular the fact is again stressed that a mask is provided in which the traditional criteria of manufacture of masks for cassettes of magnetic tapes are modified, since ridges which perform the centering of the hub with respect to the middle plane of the cassette are provided, as well as ridges which perform the alignment of the tape, thereby separating the two functions which are currently assigned to the ordinary undulations provided on the masks.

This allows to provide relatively rigid ridges to support the hubs and the weight of any tape wound thereon, so as to perfectly center said hubs on the middle plane of the cassette, and to have an extremely "soft" contact between the mask and the tape in order to perform its alignment, this being considerably advantageous since the greatest friction occurs in the region of contact between the tape and the mask due to the presence of the metallic oxides applied on the magnetic tape.

The invention thus conceived is susceptible to numerous modifications and variations, all of which are within the scope of the inventive concept.

Moreover, all the details may be replaced with other technically equivalent elements.

In practice, the materials employed, as well as the contingent dimensions and shapes, may be any according to the requirements.

I claim:

1. Mask for magnetic tape cassettes of the type comprising reels of magnetic tape in a box-like cassette shell having a middle plane and inner walls, wherein the reels have hubs defining axial ends having a peripheral region and the magnetic tape has longitudinal edges and defines windings on said reels, said mask comprising a sheet-like element having a longitudinal extension and being insertable between said axial ends of said reels of magnetic tape and said inner walls of said box-like cassette shell, and a pair of holes formed in said sheet-like element and being located at said hubs of said reels, wherein said sheet-like element defines at least one centering ridge having a high degree of elastic rigidity and at least partially engaging said peripheral region of said axial ends for centering said hubs with respect to said middle plane of said box-like cassette shell, and at least one alignment ridge having a low degree of elastic rigidity and being engagable with said longitudinal edges of said magnetic tape for aligning said winding, wherein said at least one centering ridge and said at least one alignment ridge extend substantially perpendicular to said longitudinal extension of said sheet-like element.

2. Mask for magnetic tape cassettes according to claim 1, wherein each said at least one centering ridge is located between at least two alignment ridges.

3. Mask for magnetic tape cassettes according to claim 2, wherein said at least two alignment ridges are symmetrical with respect to said at least one centering ridge.

4. Mask for magnetic tape cassettes according to claim 2, wherein each of said reels has an axis of rotation, and wherein said at least one centering ridge and said at least two alignment ridges are symmetrical with respect to said axis of rotation of at least one of said reels.

5. Mask for magnetic tape cassettes of the type comprising reels of magnetic tape in a box-like cassette shell having a middle plane and inner walls, wherein the reels have hubs defining axial ends having a peripheral region and the magnetic tape has longitudinal edges and defines windings on said reels, said mask comprising a sheet-like element having a longitudinal extension and being insertable between said axial ends of said reels of magnetic tape and said inner walls of said box-like cassette shell, and a pair of holes formed in said sheet-like element and being located at said hubs of said reels, wherein said sheet-like element defines at least one centering ridge having a high degree of elastic rigidity and at least partially engaging said peripheral region of said axial ends for centering said hubs with respect to said middle plane of said box-like cassette shell, and at least one alignment ridge having a low degree of elastic rigidity and being engagable with said longitudinal edges of said magnetic tape for aligning said winding, wherein said at least one centering ridge and said at least one alignment ridge extend transversely to said longitudinal extension of said sheet-like element.

6. Mask for magnetic tape cassettes according to claim 5, wherein each said at least one centering ridge is located between at least two alignment ridges.

7. Mask for magnetic tape cassettes according to claim 6, wherein said at least two alignment ridges are symmetrical with respect to said at least one centering ridge.

8. Mask for magnetic tape cassettes according to claim 6, wherein each of said reels has an axis of rotation, and wherein said at least one centering ridge and said at least two alignment ridges are symmetrical with respect to said axis of rotation of at least one of said reels.

9. Mask for magnetic tape cassettes of the type comprising reels of magnetic tape in a box-like cassette shell having a middle plane and inner walls, wherein the reels have hubs defining axial ends having a peripheral region and the magnetic tape has longitudinal edges and defines windings on said reels, said mask comprising a sheet-like element having a longitudinal extension and being insertable between said axial ends of said reels of magnetic tape and said inner walls of said box-like cassette shell, and a pair of holes formed in said sheet-like element and being located at said hubs of said reels, wherein said sheet-like element defines at least one centering ridge having a high degree of elastic rigidity and at least partially engaging said peripheral region of said axial ends for centering said hubs with respect to said middle plane of said box-like cassette shell, and at least two alignment ridges having a low degree of elastic rigidity and being engagable with said longitudinal edges of said magnetic tape for aligning said winding, wherein said at least one centering ridge is located between said at least two alignment ridges, wherein said at least one centering ridge and said at least two alignment ridges extend transversely to said longitudinal extension of said sheet-like element.

* * * * *